(12) United States Patent
Park et al.

(10) Patent No.: US 11,310,068 B2
(45) Date of Patent: Apr. 19, 2022

(54) DEVICE OF CONTROLLING RELATED DEVICE USING ARTIFICIAL INTELLIGENCE BASED ON OPERATION SITUATION, SCHEDULE BOT AND SERVER CONTROLLING THEREOF

(71) Applicant: LG Electronics Inc., Seoul (KR)

(72) Inventors: Sang Bae Park, Seoul (KR); Suhwan Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 16/232,765

(22) Filed: Dec. 26, 2018

(65) Prior Publication Data

US 2019/0199549 A1 Jun. 27, 2019

Related U.S. Application Data

(63) Continuation of application No. PCT/KR2017/015508, filed on Dec. 26, 2017.

(51) Int. Cl.
*H04L 12/28* (2006.01)
*H04L 67/50* (2022.01)

(52) U.S. Cl.
CPC ........ *H04L 12/2829* (2013.01); *H04L 12/282* (2013.01); *H04L 12/2803* (2013.01);
(Continued)

(58) Field of Classification Search
CPC ............. H04L 12/2803; H04L 12/2816; H04L 12/282; H04L 67/22
See application file for complete search history.

(56) References Cited

U.S. PATENT DOCUMENTS 5,255,181 A * 10/1993 Chapman ............... G06Q 10/06
705/7.25
6,876,889 B1 4/2005 Lortz et al.
(Continued)

FOREIGN PATENT DOCUMENTS

CN 103210608 7/2013
CN 104365079 2/2015
(Continued)

OTHER PUBLICATIONS

Evans, Grayson, "Solving Home Automation Problems Using Artificial Intelligence Techniques," IEEE Transactions on Consumer Electronics, IEEE Service Center, New York, NY, US, vol. 37, No. 3, Aug. 1, 1991, pp. 395-400, XP000263213.

(Continued)

*Primary Examiner* — Robert A Cassity
(74) *Attorney, Agent, or Firm* — Fish & Richardson P.C.

(57) ABSTRACT

This application is a technology with regard to a device that controls a related device based on an operation situation using artificial intelligence, a schedule bot and a server that controls the same, and the device that receives a control of the related device based on the operation situation by an exemplary embodiment of this application includes a function unit that performs a physical function of the device, a communication unit that receives a time schedule and function information from a related device or a schedule management device, and control unit that controls the function unit to maintain a ready state so that a function unit performs a first function at a point that is indicated in the time schedule by using the time schedule and the function information that the communication unit receives.

20 Claims, 10 Drawing Sheets

(52) U.S. Cl.
CPC ...... *H04L 12/2816* (2013.01); *H04L 12/2827* (2013.01); *H04L 67/22* (2013.01); *H04L 2012/285* (2013.01); *H04L 2012/2847* (2013.01)

(56) References Cited

U.S. PATENT DOCUMENTS

| | | | |
|---|---|---|---|
| 9,541,912 B1 | 1/2017 | Grossman et al. | |
| 2007/0233285 A1* | 10/2007 | Yamamoto | H04L 12/2825 700/28 |
| 2011/0295406 A1* | 12/2011 | Horst | G05B 23/0235 700/104 |
| 2012/0209444 A1* | 8/2012 | Seo | D06F 34/28 700/295 |
| 2012/0323392 A1* | 12/2012 | Gerdes | H02J 3/14 700/296 |
| 2014/0180443 A1* | 6/2014 | Waki | G06Q 10/06 700/28 |
| 2015/0019714 A1 | 1/2015 | Shaashua et al. | |
| 2015/0227118 A1* | 8/2015 | Wong | H04L 12/2827 700/44 |
| 2016/0139575 A1* | 5/2016 | Funes | H04L 12/2823 700/275 |
| 2017/0115652 A1* | 4/2017 | Grossman, IV | G05B 19/05 |

FOREIGN PATENT DOCUMENTS

| | | |
|---|---|---|
| CN | 104379827 | 2/2015 |
| CN | 104471958 | 3/2015 |
| EP | 3235182 | 10/2017 |
| JP | 2016-208110 A | 12/2016 |
| JP | 6116225 | 4/2017 |
| KR | 10-2005-0066328 A | 6/2005 |
| KR | 10-2008-0046964 A | 5/2008 |
| KR | 10-1000792 B1 | 5/2010 |
| KR | 10-2014-0077489 A | 6/2014 |
| WO | 2006-030742 A1 | 3/2006 |

OTHER PUBLICATIONS

Extended European Search Report in European Application No. 18214469.1, dated May 7, 2019, 13 pages.
Office Action in Chinese Appln. No. 201811600294.6, dated Aug. 9, 2021, 94 pages (with English translation).

* cited by examiner

DEVICE OF CONTROLLING RELATED DEVICE USING ARTIFICIAL INTELLIGENCE BASED ON OPERATION SITUATION, SCHEDULE BOT AND SERVER CONTROLLING THEREOF

CROSS-REFERENCE TO RELATED APPLICATIONS

The present application claims priority to International Patent Application No. PCT/KR2017/015508, filed on Dec. 26, 2017, which is hereby incorporated by reference in its entirety.

TECHNICAL FIELD

This application relates to a device that controls a related device based on an operation situation, and a schedule bot and a server that control the same.

BACKGROUND ART

In recent years, home appliances capable of transmitting and receiving information with other devices are being provided as communication technology is applied to various home appliances. In particular, according to Korean Patent Application No. 10-2003-0097598, the technology for turning on/off a lamp in a specific space based on an operation situation of the home appliances during an operation of home appliances.

FIG. 1 shows a system configuration for controlling home appliances, which uses a smart server in the prior art. FIG. 1 is related to controlling a plurality of home electric appliances connected with a home network manager 2 and a smart server 4. The system in FIG. 1 notifies a user of a washing end message by the smart server 4 through the Internet 1 after a washing machine 3 has performed a laundry course, or controlled a lamp 5 of a laundry room through communication with a user.

On the other hand, the system as shown in FIG. 1 does not consider a behavior pattern of the user or an interaction with other home electric appliances, in that the lamp 5 is controlled based on a simple user's action that the washing machine determines. In the present specification, a method in which devices including home appliances can interact in response to a behavior pattern of user and a device of implementing said method will be described.

DISCLOSURE

Technical Problem

The invention described in the present specification solves the above-mentioned problems. This invention provides a device that suggests or guides functions of home appliances to a user so that multiple home appliances can operate in association with particular functions.

In the present specification, a behavior pattern of a user with respect to use of a device is stored and used for actively guiding the user to control another device.

The objects of this invention are not limited to the above-mentioned objects, and the other objects and advantages of this invention which are not mentioned can be understood by the following description and more clearly understood based on the embodiments of this invention. It will also be readily seen that the objects and the advantages of this application may be realized by the means defined in the claims.

Technical Solution

A device of controlling a related device based on an operation situation by an exemplary embodiment of this application may include a function unit that performs a physical function of the device; a control unit that controls the function unit, identifies the related device that performs a subsequent second function in response to a first function that is performed or is scheduled to be performed in the function unit, and generates a time schedule and function information to be transmitted to the related device; and a communication unit that transmits the time schedule and the function information that the control unit generates to the related device.

A device of controlling a related device based on an operation situation by another embodiment of this application may include a function unit that performs a physical function of the device; a control unit that controls the function unit, and generates information on a first function that is performed or is scheduled to be performed in the function unit; and a communication unit that transmits the generated information on the first function to an externally arranged schedule management device.

A device which is controlled by a related device based on an operation situation by still another embodiment of this application may include a function unit that performs a physical function of a device; a communication unit that receives a time schedule and function information from the related device or a schedule management device; and a control unit that controls the function unit to maintain a Ready state in which the function unit is prepared for performing a first function at a time point indicated in the time schedule by using the time schedule and the function information that the communication unit receives.

A schedule bot of controlling a related device based on an operation situation by yet another embodiment of this application may include a device information storage unit that stores information on devices belonging to two or more related groups and stores information on related functions of the devices; a behavior pattern storage unit that stores behavior pattern information of a user with respect to use of the devices; a control unit that, when information on a first function is received from a device among the devices, identifies the related device that performs a subsequent second function in response to a first function and generates a time schedule and function information to be transmitted to the related device; and a communication unit that transmits and receives messages to and from the devices and transmits the time schedule and the function information that the control unit generates to the related device.

A server of controlling a related device based on an operation situation by yet another embodiment of this application may include a device information storage unit that stores information of devices belonging to two or more related groups, and stores information on related functions of the devices; a behavior pattern storage unit that receives behavior pattern information of a user with respect to use of the devices from the devices and stores it; a control unit that, when information on a first function is received from a device among the devices, identifies a related device that performs a subsequent second function in response to the first function, and generates a time schedule and function information to be transmitted to the related device and a communication unit that transmits and receives messages to and from the devices and transmits the time schedule and the function information that the control unit generates to the related device.

Advantageous Effects

When this invention is applied, a use history of various products in a space and a behavior pattern of user are collected in a server or a schedule bot and a use pattern of the user is learned. Based on the learned use pattern of the user, it is possible to configure in advance and/or guide a function of the respective devices suitable for current time, or control the function of the devices by prediction before an user's command input to control the function.

Further, when this invention is applied, the individual device, the schedule bot, or the server learns the usage pattern of the user for each device, and actively provides a service interrelated with different devices.

The effects of this invention are not limited to the above-mentioned effects, and those skilled in the art can readily understand various effects obtained by this invention based on the specific description of the invention in the following.

BEST MODE

Figure 1:
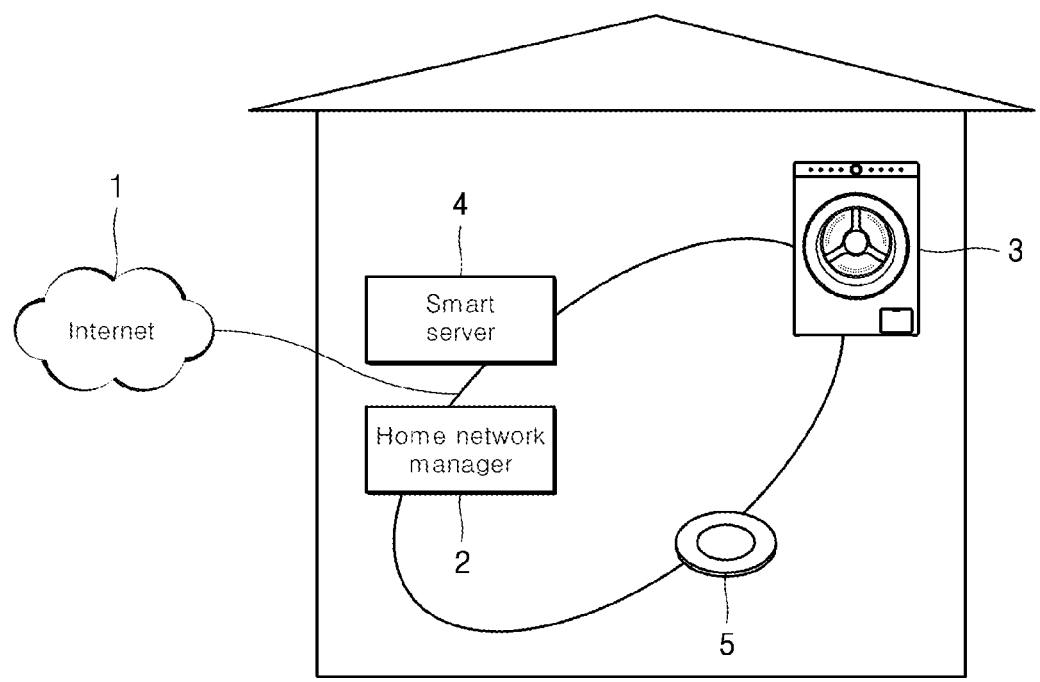
FIG. 1 shows a system configuration for controlling a home electric appliance using a smart server according to the prior art.

Hereinafter, the embodiments of this invention will be described in detail with reference to the drawings so that those skilled in the art to which this invention pertains can easily implement this invention. This invention may be implemented in many different forms and is not limited to the embodiments described herein.

In order to clearly illustrate this invention, technical explanation that is not directly related to the invention may be omitted, and same or similar components are denoted by a same reference numeral throughout the specification. Further, some embodiments of invention application will be described in detail with reference to the exemplary drawings. In adding reference numerals to components of each drawing, the same components may have the same reference numeral as possible even if they are displayed on different drawings. Further, in describing this invention, a detailed description of related known configurations and functions will be omitted when it is determined that it may obscure the gist of this application.

In describing components of this invention, it is possible to use the terms such as first, second, A, B, (a), and (b), etc. These terms are only intended to distinguish a component from another component, and a nature, an order, a sequence, or the number of the corresponding components are not limited by that term. When a component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

Further, with respect to implementation of this invention, the invention may be described by subdividing an individual component, the components of the invention may be implemented within a device or a module, or a component of the invention may be implemented by being divided into a plurality of devices or modules.

In this specification, the term "related devices" means devices which provide functions associated with each other in a time series. For example, since a refrigerator, an oven, and a dishwasher are together used by a user during cooking, these three devices are "related devices". Like this, when two or more devices are related functionally, they are referred to as "a related group".

As examples of such related group, there are following groups, but it is illustrative, and this invention is not limited thereto.

Related group related to cooking: refrigerator, oven, and dishwasher

Related group related to washing: electric wardrobe for clothes storage, washing machine, dryer Each of these related groups constitutes a functional unit, the respective devices of which operate based on a time schedule determined by utilizing a behavior pattern that a user uses the devices in each related group. Any one device belonging to a related group may also perform a function to set a time schedule of the devices in the related group and store the behavior pattern of the user and apply it for setting the time schedule, or a schedule robot or a server externally arranged and communicating with the devices in the related group may perform the function instead. The scheduling robot may be arranged between the devices in the related group and an external server.

Figure 2:
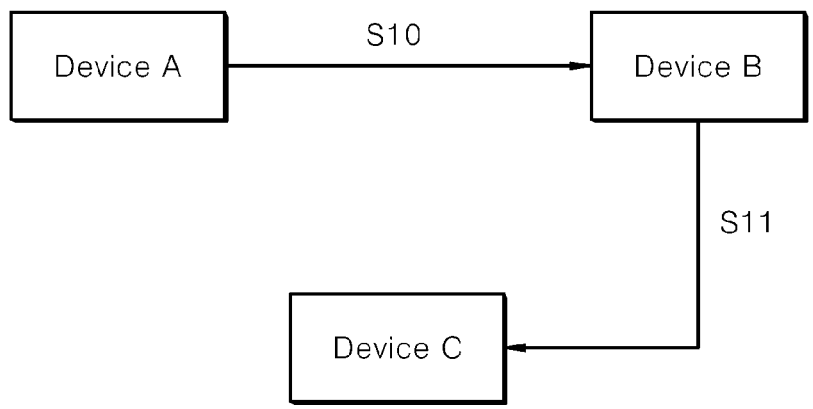
FIG. 2 shows a process in which devices in a related group interact according to an exemplary embodiment of this application.

FIG. 2 shows a process in which devices in a related group interact by an exemplary embodiment of this application. The devices A, B, and C in the related group operate in the order of A-B-C. In this case, in response to an operation set in device A, device A may transmit a time schedule and function information to device B that performs a subsequent function. In one example, device A may transmit a message of "perform Function 1 after 30 minutes" (S10) to device B.

Likewise, device B may also transmit a message of "perform Function 3 after 1 hour and 50 minutes" (S11) to device C that provides a subsequent function based on the message received in S10. As a result, when a particular function is performed by device A, in response to that, as a time schedule which includes time information of performing the subsequent functions is provided to device B and device C, it is possible to make devices B and C to be ready (as a kind of warming-up) for performing the requested functions in time.

In one example, when a turkey is taken out of a refrigerator (device A) and is cooked by using an oven (device B) and a cooked container is washed in a dishwasher (device C), a function of the oven and a time for which the oven (device B) prepares may be indicated by the refrigerator (device A) according to a time for preparing the turkey (S10). Also in the oven (device B), a message that indicates a function of the dishwasher and a time for which the dishwasher (device C) prepares in order to wash an oily container may be provided from the oven (device B) to the dishwasher (device C) (S11).

In the configuration of FIG. 2, a related group may include device A-device B-device C. An operation order between these devices or the relation of functions performed by these devices may be stored as a form of a database in each device, and it is possible to transmit a message to another device based on the stored information.

In particular, a time schedule can be generated based on a behavior pattern of user. When information that cooking tools are put into the dishwasher (device C) generally after a user uses the oven (device B) and has an hour of meal time is accumulated among the devices in the related group (A, B, and C), the time schedule may be generated by reflecting this time information according to the behavior pattern of the particular user.

Figure 3:
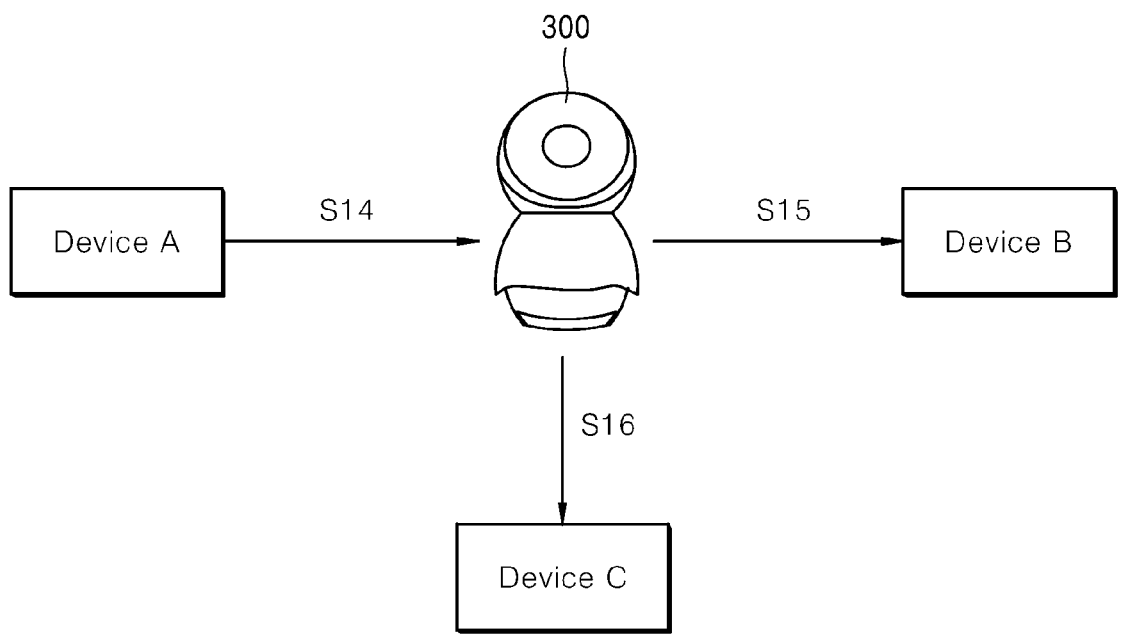
FIG. 3 shows a process in which devices in a related group and a schedule bot interact according to another embodiment of this application.

FIG. 3 shows a process in which devices in a related group and a schedule robot interact by another embodiment of this application.

In a configuration of FIG. 3, when a schedule robot 300 receives information on such as a function currently performed or prepared to be performed as a message from that device, i.e., device A (S14), it is possible to transmit a message that instructs any other device, i.e., device B or device C, to prepare for performing a subsequent specific function at a specific time point, as in S15 and S16.

Figure 4:
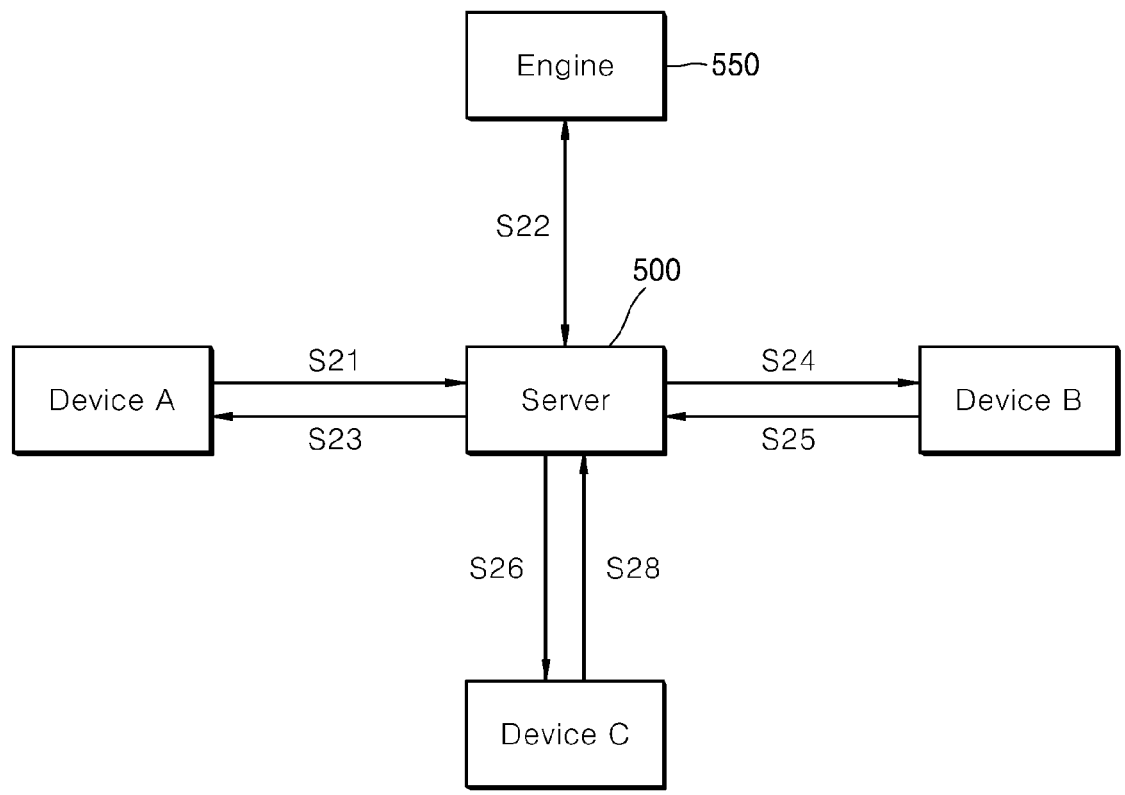
FIG. 4 shows an operation process performed among a server and devices in a related group according to still another embodiment of this application.

FIG. 4 shows an operation process between a server and multiple devices in a related group by still another embodiment of this application. In the configuration of FIG. 4, a time schedule of the related devices is configured mainly by the server by still another embodiment of this application. In FIG. 4, the devices belonging to the related group may communicate with a server 500, respectively. When the server 500 receives information on use of device A or an operation from device A, it is possible to transmit a message that instructs another device B or device C to prepare for performing a subsequent specific function at a specific time point.

As one example, device A, device B, and device C are a refrigerator, an oven, and a dishwasher, respectively. When the user uses the refrigerator (device A), the refrigerator (device A) may transmit information to the server 500 (S21). The server 500 may search previous recipe information by using an engine 550, and select a recipe taking into account the food materials stored in the refrigerator, and provide it to the refrigerator (device A) (S23).

Then, when the user uses a suggested recipe, the server 500 may utilize the searched recipe information, calculate time consumed for the user to prepare the corresponding food in the past (in a case where a behavior pattern of the user is learned), and provide these information to the oven, which is device B (S24). The oven (device B) may be set for the recipe and also set to enter into a Ready state so as to provide a cooking function for the recipe.

When the user uses the oven, the oven may transmit a use time and a function or option information, which the user sets or changes, to the server 500. The server 500 may transmit oven start information, recipe information, user meal time, and dishwasher use time information to the dishwasher (device C) (S26). The dishwasher may set an appropriate dish washing course by using the received information and wait in a Ready state capable of performing a requested function. Then, when the user uses the dishwasher in said Ready state itself or changes a preset function/option and uses it, the information on the change or details of use thereof may be transmitted to the server 500 (S28).

In summary of FIG. 4, the information that the respective devices (devices A, B, and C) collect may be transmitted to the server 500. Thus, this information can be provided to the engine 550 to learn a use pattern of the user with respect to the respective devices and to suggest particular functions to the user by grouping the functions necessary for current use. For example, when a pattern of using the dishwasher is accumulated a certain times after a barbecue function of the oven is selected in various cooking spaces, the engine 550 groups such pattern, the server 500 may instruct the dishwasher to perform subsequent functions or prepare for performing the subsequent functions.

Figure 5:
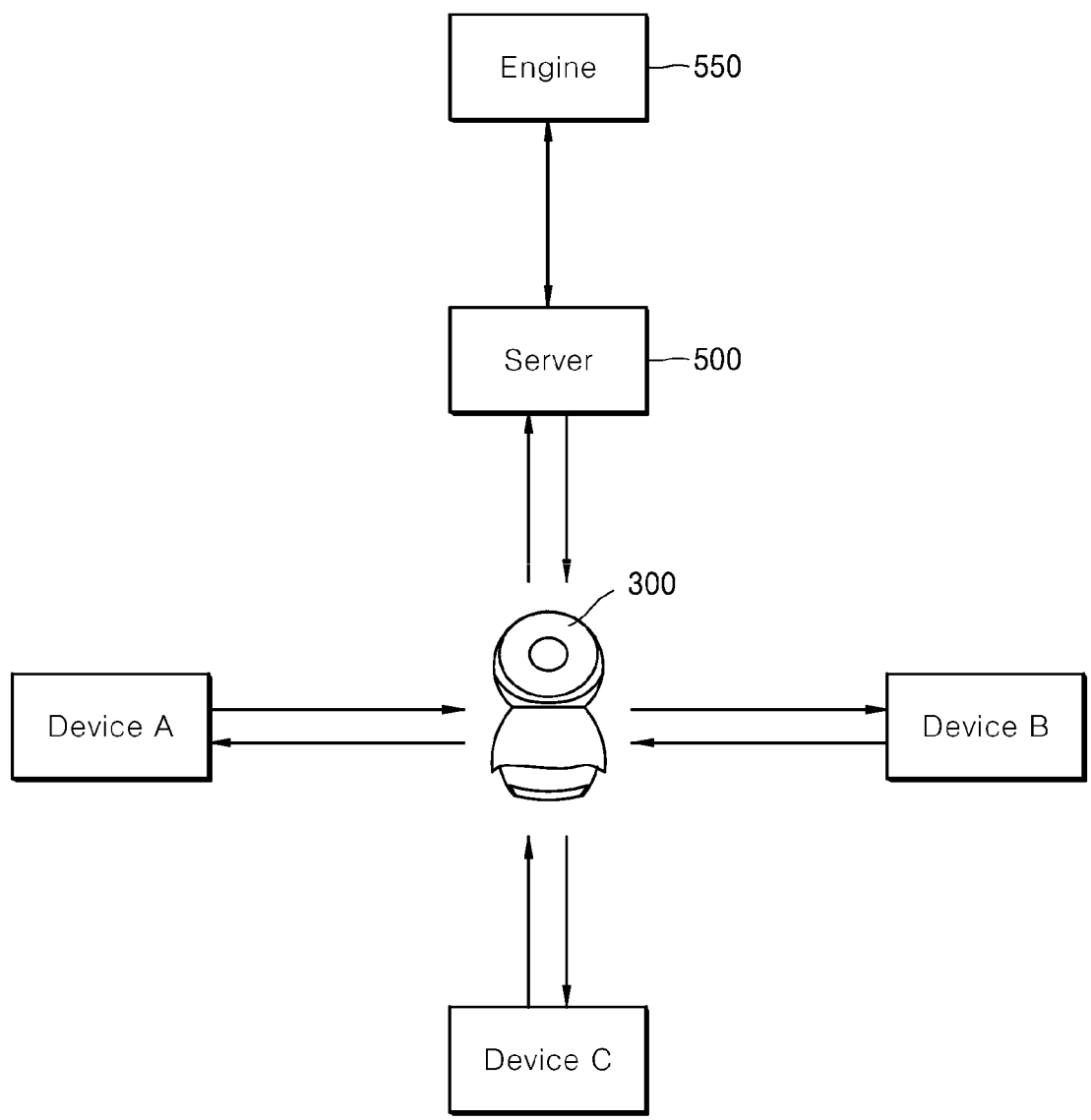
FIG. 5 shows an operation process performed among devices in a related group and a schedule bot and a server according to still another embodiment of this application.

FIG. 5 shows an operation process among devices in a related group, a schedule robot and a server by still another embodiment of this application.

In the above, in FIG. 3, the schedule robot 300 is mainly described. In FIG. 4, the server 500 is mainly described. The configuration of FIG. 5 corresponds to a combination of those of FIGS. 3 and 4, and thus shows a process in which a schedule robot 300 and a server 500 together work for setting a time schedule and functions for the respective devices.

The devices (devices A, B, and C) in each of the related groups may perform a communication with a schedule robot 300. On the other hand, the schedule robot 300 may transmit the received information to the server 500, and when the server 500 provides information calculated through an engine 550, the server may transmit the information to the devices (devices A, B, and C) back. Unlike FIG. 4, in FIG. 5, the schedule robot 300 may communicate directly with the respective devices without the server 500 directly communicating the devices (devices A, B, and C).

Detailed operations in the configuration of FIG. 5 are similar to operations in FIG. 3 or FIG. 4, and specific examples of each operation will be described later.

Figure 6:
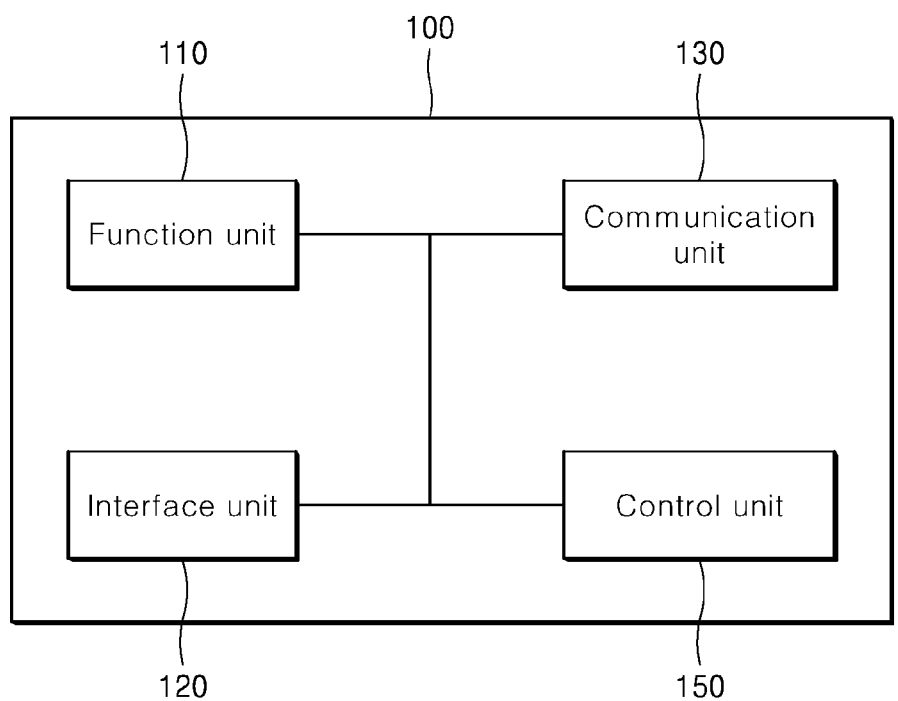
FIG. 6 shows a configuration of a device according to an exemplary embodiment of this application.

FIG. 6 shows a configuration of a device by an exemplary embodiment of this application.

A device 100 also corresponds to devices A, B, and C in FIGS. 2 to 5 in the above. The device 100 may be able to directly transmit a time schedule and function information to the related devices as in FIG. 2, and transmitting the time schedule and function information to a schedule management device such as a schedule bot 300 or a server 500, as in FIGS. 3 and 5, and transmitting the time schedule and function information to another related device again instead of the schedule management device.

The schedule management device may be a schedule robot 300 that communicates with related devices and is arranged in a same space same as the related devices. Further, another example of the schedule management device may be a server 500 that communicates with the related devices and is arranged in a space spaced apart from the related devices.

First, respective components of a device corresponding to device A of FIG. 2 will be described.

A function unit 110 may perform a physical function of the device. For example, a physical function may be a cleaning function for a cleaner, a freezing and refrigeration function for a refrigerator, a heating function for an oven, and a dish washing function for a dishwasher. In the case of a washing machine, the physical function can be a washing function, and in the case of a dryer, the physical function can be a drying function. The function unit 110 may perform a specific function that the device provides and may include various mechanical components.

Next, a communication unit 130 may transmit and receive a message to and from other devices, a schedule bot 300, and a server 500. An interface unit 120 may enable a user to select an option of a function or an option associated with the function or to monitor an operation situation of a device. A touch screen, a speech recognition, a speech guidance, a button input, etc., may be a example. A control unit 150 can control each component in the device.

In more detail, device A in FIG. 2 will be mainly described. The control unit 150 may control the function unit 110 and identify a related device (for example, device B) that performs a subsequent second function in response to a first function that is performed or is scheduled to be performed in the function unit 110, and generate a time schedule and function information to be transmitted to the related device.

Next, the communication unit 130 may transmit the generated time schedule and function information to the other related device (in case of FIG. 2, device B) so as to make device B to maintain a Ready state in which device B perform the second function or is prepared for performing the second function.

Here, the control unit 150 may generate the time schedule and the function information based on the behavior pattern information of the user with respect to the first function that the function unit 110 performs. The time schedule may be information on a time difference between the first function and the second function. The other related device (for example, device B or device C of FIG. 2) can maintain the Ready state in which the second function is performed after a time period corresponding to the time difference has passed.

In the configuration of FIG. 2, a communication between the devices can be bidirectional or unidirectional (like broadcasting). According to FIG. 2, device A designates device B as a recipient and transmits a message to device B. By the way, when device A cannot designate another related device, i.e. device B, only the time schedule is broadcasted, and device B and device C, which receive it, can provide a preset function accordingly.

Table 1 is an embodiment showing a configuration of a message including a time schedule and function information.

TABLE 1

| Case | Device | WorkingFunction | EstimatedEndingTime |
|---|---|---|---|
| 1 | Refrigerator | CarryOut(Turkey) | 2017.12.21 13:25:00 |
| 2 | Oven | Barbecue(Turkey) | 2017.12.21 14:01:00 |
| 3 | Dishwasher | Washing(Big, Oiliness) | 2017.12.21 16:51:00 |
| 4 | WashingMachine | Washing(Blouse) | 2017.12.21 17:10:00 |
| 5 | ClothDryer | Drying(Blouse) | 2017.12.21 19:30:00 |

"Device" item is identification information of a device that performs a function. "WorkingFunction" means a function to be currently performed or scheduled to be performed. "EstimatedEndingTime" indicates a time point at which a function ends. In view of each case, an operation of a turkey being taken out of a refrigerator (CarryOut (Turkey)) can be performed. After a refrigerator door is closed, a time point at which the turkey is taken out and the cleaning and trimming of the turkey is completed may be as indicated in "EstimatedEndingTime". Of course, a time point in which the turkey reaches an oven after the cleaning and trimming process can be set as "EstimatedEndingTime".

When the behavior pattern information of the user is stored, a value of EstimatedEndingTime can be more accurate. Thus, when information on time period for which the turkey (or similar food) is taken out from the refrigerator and put into the oven is stored as the past behavior pattern of the user, it is possible to configure EstimatedEndingTime more correctly by reflecting the stored information.

When a communication unit of the refrigerator transmits information such as Case 1 by broadcasting, it is possible to identify through the message received by the oven that the turkey needs to be cooked. In particular, when information that the refrigerator searched a turkey grill as a recipe is added, such searched recipe information may also be included in the function information. For example, information such as CarryOut (Turkey, BarbecueSearched) may be included in a message and broadcasted.

In Case 2, a function to barbecue the turkey in an oven and time information indicating an end time point of this function are included in a message. Case 3 is a message about an operation in which a dishwasher washes an oily large cooking tool and an end time point of this function. Case 4 is a message of the function in which a washing machine washes a blouse and an end time point of this function. Case 5 is a message of a function in which a clothes dryer dries a blouse and an end time point of this function.

When Case 1 is transmitted, the functions and the time information to be performed by the respective devices can be predicted and provided as messages in Cases 2 and 3. For example, Case 1 may correspond to S10 in FIG. 2, and Case 2 may correspond to S11 in FIG. 2.

Further, it is possible to integrate and apply Cases 1 to 3 to a broadcasting-type transmission method.

Figure 7:
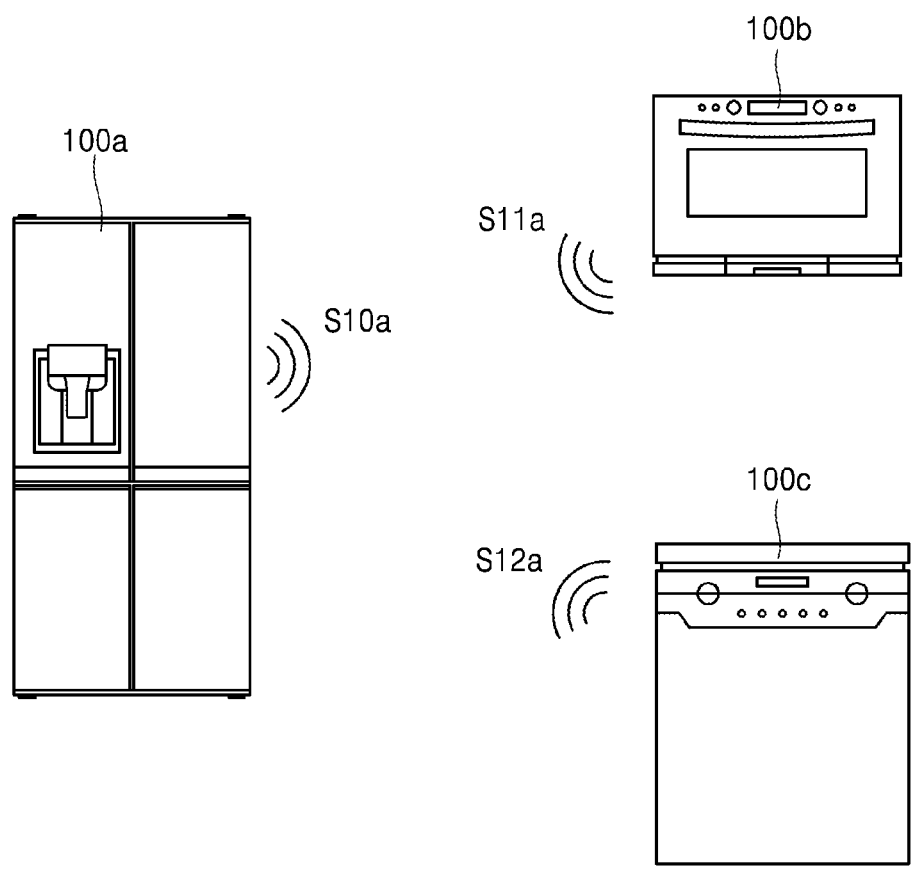
FIG. 7 shows a process of broadcasting a message among the devices according to an exemplary embodiment of this application.

FIG. 7 shows a process of broadcasting a message between related devices by an exemplary embodiment of this application. When a recipe of turkey barbecue cooking is searched in a refrigerator 100*a* and a turkey is taken out, the refrigerator 100*a* may broadcast a message of the contents as in Case 1 (or directly transmit it to a specific device) (S10*a*).

An oven 100*b* may provide a Ready function of preheating in advance or preparing itself for starting preheating at 13:25:00 on Dec. 21, 2017, by reflecting an estimated time (based on EstimatedEndingTime of Case 1) that a turkey is cooked based on a received message. In this state, when the user puts the turkey into the oven 100*b* and selects the previously prepared function (Barbecue), the oven 100*b* may broadcast a message that has the same contents as in Case 2 (or directly transmit it to a specific device) (S11*a*).

Similarly, a dishwasher 100*c* may provide a Ready function of preparing itself to wash an oily cooking tool in advance based on an estimated time (based on the EstimatedEndingTime of Case 2) that a cooking of a turkey is finished based on the received message. In this process, when a user has a turkey as dinner, it is possible to adjust the estimated time by reflecting a meal time.

In this state, when the user puts the cooking tool into the dishwasher 100*c* and selects the previously prepared function (Washing (Big, Oiliness)), the dishwasher 100*c* may broadcast a message of the contents as in Case 3 (or directly transmit it to the specific device) (S12*a*). Further, a message can be transmitted to a cellular phone of the user to notify that an operation of the dishwasher is finished.

In FIGS. 2, 6, and 7, a device may couple the time schedule and the function information, such as the information on the function that is performed by the device itself and a time point that this function is finished or a time point that estimated based on the behavior pattern of the user, and transmit the coupled information to another device in the related group, and other devices may prepare subsequent functions in response to that.

Further, under the state where the related devices are prepared, information on whether or not the actual user selects and operates the prepared function may be stored as the behavior pattern of the user, and the information may be reflected to the operations of the device later.

For example, when the user takes out the turkey and does not put it in the oven repeatedly, even if the turkey is taken out of the refrigerator, a message that indicates a barbecue function of the oven may not be transmitted from the refrigerator.

Further, when a time that is taken to eat after cooking of the turkey or a time that is taken to eat after cooking of other food is repeatedly stored in the device, the relevant time schedule can be generated by using this stored information.

In the configurations of FIGS. 2, 6 and 7, each device may have a function to transmit its own function information and time schedule, but may also have a function to receive function information and time schedule of another device and operate itself based on the received information. Of course, as in FIGS. 3 to 5, it is possible for a device to receive a time schedule from the schedule management device, such as the schedule bot 300 or the server 500, or to be instructed for this function. A configuration of such device will be described.

It is the same that the function unit 110 performs the physical function of the device. The communication unit 130 may receive a time schedule and function information from the related device or the schedule management device. The time schedule and the function information are as shown in Table 1. Alternatively, the function information may includes a command instructing a related device to operated according to given function information.

The control unit 150 may control the function unit 110 to maintain the Ready state in which the function unit 110 is prepared for performing the first function at the time point indicated in the time schedule by using the time schedule and the function information that the communication unit 130 receives.

Here, the time schedule may include information on a second function that another device performs prior to the first function to be performed by the device, and information on an end time point of the second function which is calculated based on the behavior pattern of the user. In this case, a function of "Barbecue" to be performed by the oven can be included in the function information.

Alternatively, as in Table 1, when the communication unit 130 may receive the time schedule and the information from a related device, the function information may include information on the second function performed in the related device prior to the first function. For example, in the case of the oven, the function of "CarryOut" that the refrigerator performs in the above may be included in the function information delivered to the oven.

That is, the message that the communication unit 130 receives from the related device may include information on the function that the related device performs, is scheduled to perform, or has finished. Further, the message may include the information on the function that the device including the communication unit 130 is expected to perform.

On the other hand, components of a device in the case as in FIGS. 3 to 5, where respective devices themselves transmit function information to a schedule management device, will be described. The components of the device are the same as those of the device 100 in FIG. 6.

The control unit 150 may control the function unit 110 to perform a physical function of the device and generate information on the first function that is performed or is scheduled to be performed by the function unit. For example, the information on the first function may correspond to the WorkingFunction in Table 1 above.

The communication unit 130 may transmit the generated information on the first function to an externally arranged schedule management device. The information like the WorkingFunction in Table 1 only can be transmitted to the schedule management device.

For example, when the refrigerator transmits the function information of "CarryOut (Turkey)" to the schedule management device, the schedule management device may identify the related device (oven) based on the function information, and search a related function of "Barbecue(Turkey)"). Further, the time management device may calculate a time difference between the execution of the "CarryOut (Turkey)" function and the "Barbecue (Turkey)" function and calculate the EstimatedEndingTime to transmit it to the oven.

Of course, the control unit 150 of the device 100 may generate the behavior pattern information of the user for the first function that the function unit 110 performs, and the communication unit 130 may transmit the time scheduled based on the behavior pattern information to the schedule management device. For example, in case the refrigerator and the oven are involved, it is possible to determine the behavior pattern information of the user recorded in the refrigerator and the oven for a quite time period (for example, the time taken for putting a turkey into the oven after taking it out from the refrigerator) and store the behavior pattern. This information may be accumulated and stored in the schedule management device. That is, the time schedule that the schedule management device generates may be information on the first function including the end time point of the first function that is estimated from the behavior pattern information of the user.

Figure 8:
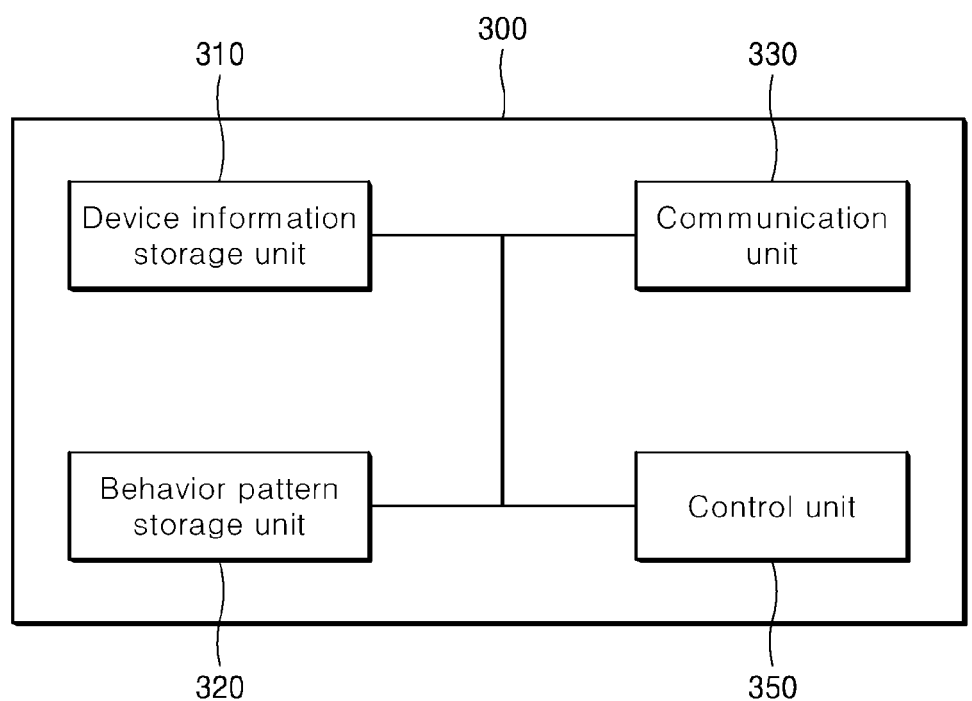
FIG. 8 shows a configuration of a schedule bot according to an exemplary embodiment of this application.

FIG. 8 shows a configuration of a schedule bot by an exemplary embodiment of this application. The schedule bot 300 is an example of the schedule management device as described above.

A schedule bot 300 may control a related device based on an operation situation. For this purpose, a device information storage unit 310 may store information on devices belonging to two or more related groups, and store information on related functions of the devices. A behavior pattern storage unit 320 may store behavior pattern information of a user with respect to usage of the devices.

When a control unit 350 receives information on a first function from a first device of the devices, the control unit 350 may identify a related device that performs a subsequent second function in response to the first function and generate a time schedule and function information to be transmitted to the related device. A communication unit 330 may transmit and receive messages to and from the devices, and transmit the time schedule and function information that the control unit generates to the related devices.

The control unit 350 may generate the time schedule and function information based on the behavior pattern information of a user with respect to a first function that a device performs. That is, when there is behavior pattern information of a user collected from a device that transmits the function information and another related device belonging to the same related group with the device, it is possible to generate the time schedule and the function information based on the behavior pattern information.

For example, when a refrigerator and an oven are involved, it is possible to calculate a behavior pattern information of a user (for instance, the time taken for put a turkey into the oven after taking it out from the refrigerator) based on information that is received from the refrigerator and the oven and stored in the behavior pattern storage unit 320, and then store the behavior pattern information of the user. This information may be accumulated and stored in a schedule management device. Thus, a time schedule that the schedule bot 300 generates may be information on a first function and an end point of the first function that is estimated from the behavior pattern information of the user.

Based on FIG. 3, a control unit 350 of the schedule bot 300 may generate a time schedule and function information based on a behavior pattern information of a user with respect to a first function that device A performs. The time schedule may be information on a time difference between the execution of a first function and a second function. After a time corresponding to the time difference passed, the related device (for example, device B or device C of FIG. 2) can maintain a Ready state so that the second function is performed.

Figure 9:
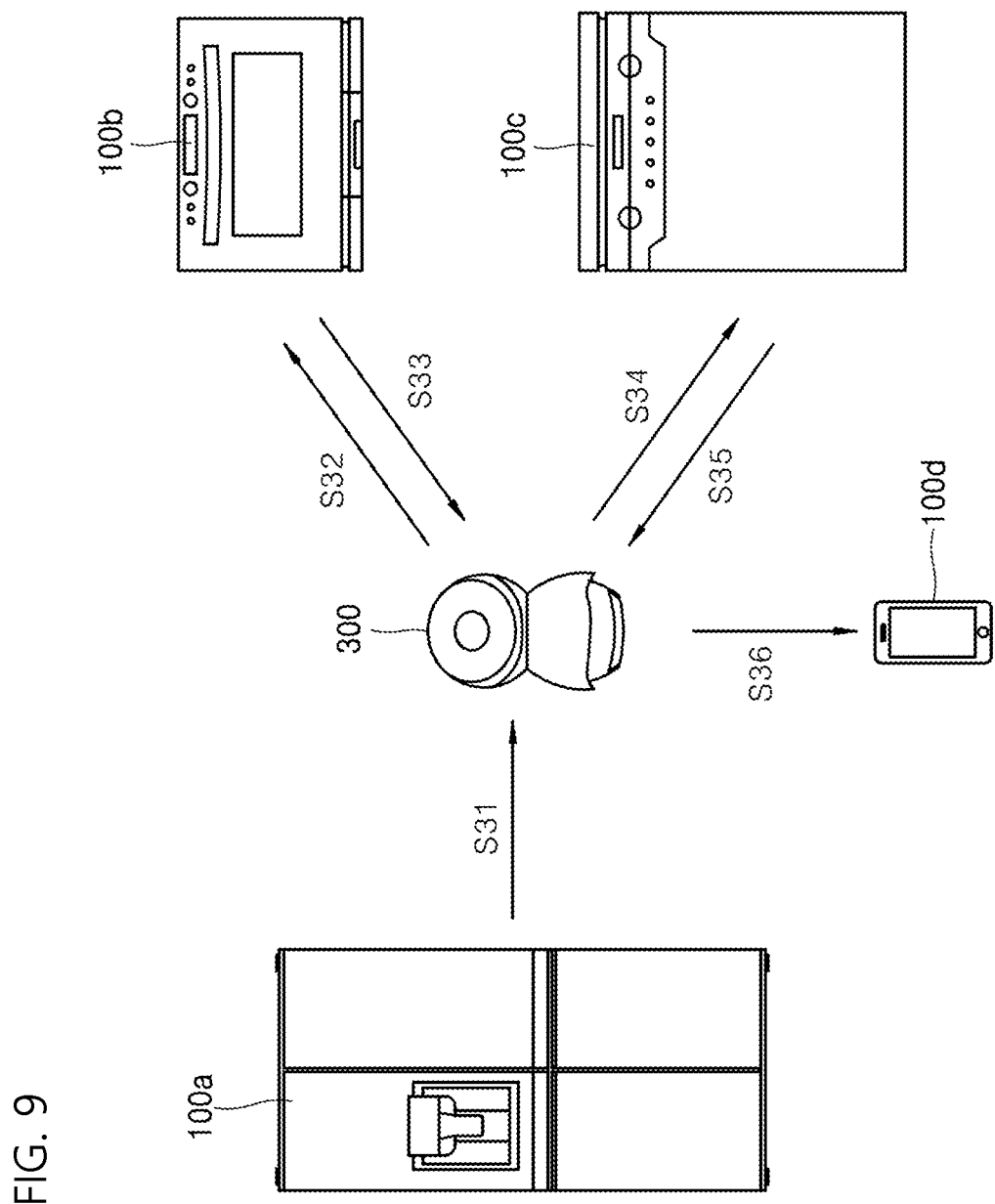
FIG. 9 shows a process in which a schedule bot 300 controls devices according to an exemplary embodiment of this application.

FIG. 9 shows a process in which a schedule bot 300 controls devices by an exemplary embodiment of this application. Table 2 shows a configuration of a message that respective devices 100a, 100b, and 100c transmit to a schedule bot 300 in FIG. 9.

TABLE 2

| Case | Device | WorkingFunction |
|------|--------|-----------------|
| 1s | Refrigerator | CarryOut(Turkey, Barbecue) |
| 2s | Oven | Barbecue(Turkey) |
| 3s | Dishwasher | Washing(Big, Oiliness) |

Table 3 shows a configuration of a message that the schedule bot 300 transmits to die respective devices 100a, 100b, and 100c.

TABLE 3

| Case | Device | WorkingFunction | EstimatedEndingTime |
|------|--------|-----------------|---------------------|
| 2r | Oven | Barbecue(Turkey) | 2017.12.21 14:01:00 |
| 3r | Dishwasher | Washing(Big, Oiliness) | 2017.12.21 16:51:00 |
| 4r | Smartphone | DishWashComplete | 2017.12.21 16:53:00 |

When a recipe of a turkey barbecue cooking is searched from a refrigerator 100a and a turkey is taken out, the refrigerator 100a may transmit a message that has the same contents as Case is of Table 2 to the schedule bot 300 (S31).

A control unit 350 of the schedule bot 300 may search a related device that performs the next function based on a received message in a device information storage unit 310. As a result of searching, an oven 100b may be searched, and it is confirmed that functions that an oven can provide include a Barbecue(Turkey) cooking function.

On the other hand, the control unit 350 of the schedule bot 300 can calculate an estimated time until the turkey starts being cooked based on the function information of Case 1 s (WorkingFunction). For this calculation, the control unit 350 may search for corresponding behavior pattern information of the user in a behavior pattern storage unit 320 and then calculate the estimated time. When a calculated value is "2017.12.21 14:01:00", the schedule bot 300 may transmit a message such as Case 2r to the oven 100b (S32).

As a result, the oven 100b may apply the EstimatedEndingTime of Case 2r and provide a Ready function capable of preheating in advance or preparing itself for starting preheating at 14:01:00 on Dec. 21, 2017. In this state, if the user puts the turkey into the oven 100b and selects the previously prepared function (Barbecue), the oven 100b may transmit a message like Case 2s to the schedule bot 300 (S33).

Like as the above described process, the control unit 350 of the schedule bot 300 may search another related device that performs the next function based on the received messages in the device information storage unit 310. As a result of searching, a dishwasher 100c is searched and it is confirmed that functions that the dishwasher 100c can provide includes a "Washing(Big, Oiliness)" function. Further, the schedule bot 300 may calculate the estimated time that the cooking of the turkey is finished.

To this calculation, a weight of the turkey and a timer that is pre-configured in the oven 100b can be considered. Further, when a time consumed for the user to eat is previously stored in the behavior pattern information, it is possible to reflect it as well. For example, when time difference between when the user put cooking utensils into the dishwasher 100c and when the user cooked using the oven 100b in the past is accumulated and is stored in the behavior pattern storage unit 320, the control unit 350 of the schedule bot 300 can calculate the EstimatedEndingTime based on the accumulated and stored information. That is, it is possible to calculate the estimated time by reflecting even the meal time when the user has the dinner with the turkey.

As a result, the control unit 350 of the schedule bot 300 may generate a message similar to Case 3r of Table 3 and transmit it to the dishwasher 100c (S34), and the dishwasher may provide a Ready function capable of being prepared in advance for washing an oily container based on EstimatedEndingTime of the message such as Case 3r.

In this state, when the user puts the cooling utensils into the dishwasher 100c and selects the previously prepared function (Washing (Big, Oiliness)), then the dishwasher 100c may transmit the message like Case 3s to the schedule bot 300 (535).

Similarly, the control unit 350 of the schedule bot 300 may search another related device that performs the next function based on the received message in the device information storage unit 310. After searching, since there is no next function to be performed any more, it may transmit a message that informs "DishWashComplete" to a smart phone 100d together with a time schedule like Case 4r of Table 3 in order to inform the user of an end of dish washing by the dishwasher (S36).

In FIG. 9, in the devices in the related group for the user being used, the schedule bot 300 stores the past behavior pattern information of the user and information on a correlation between the functions of the respective devices 100a, 100b, and 100c, and the respective devices 100a, 100b, and 100c transmit information on a function currently performed or scheduled to be performed to the schedule bot 300, than the schedule bot 300 may search for another related device and transmit a message that instructs the search device to prepare itself for a specific function.

In this process, information on whether the user uses the prepared function without modification of the prepared function or not, or information on whether the actual time coincides with an estimated time or there is a time difference between the actual time and the estimated time, can be stored in the device information storage unit 310 and the behavior pattern storage unit 320 of the schedule bot 300. Here, the stored information allows the related devices to prepare the respective functions more accurately when such functions are requested to perform next time.

The schedule bot 300 may guide a function necessary for a user through a speech utterance or a flickering, etc.

Figure 10:
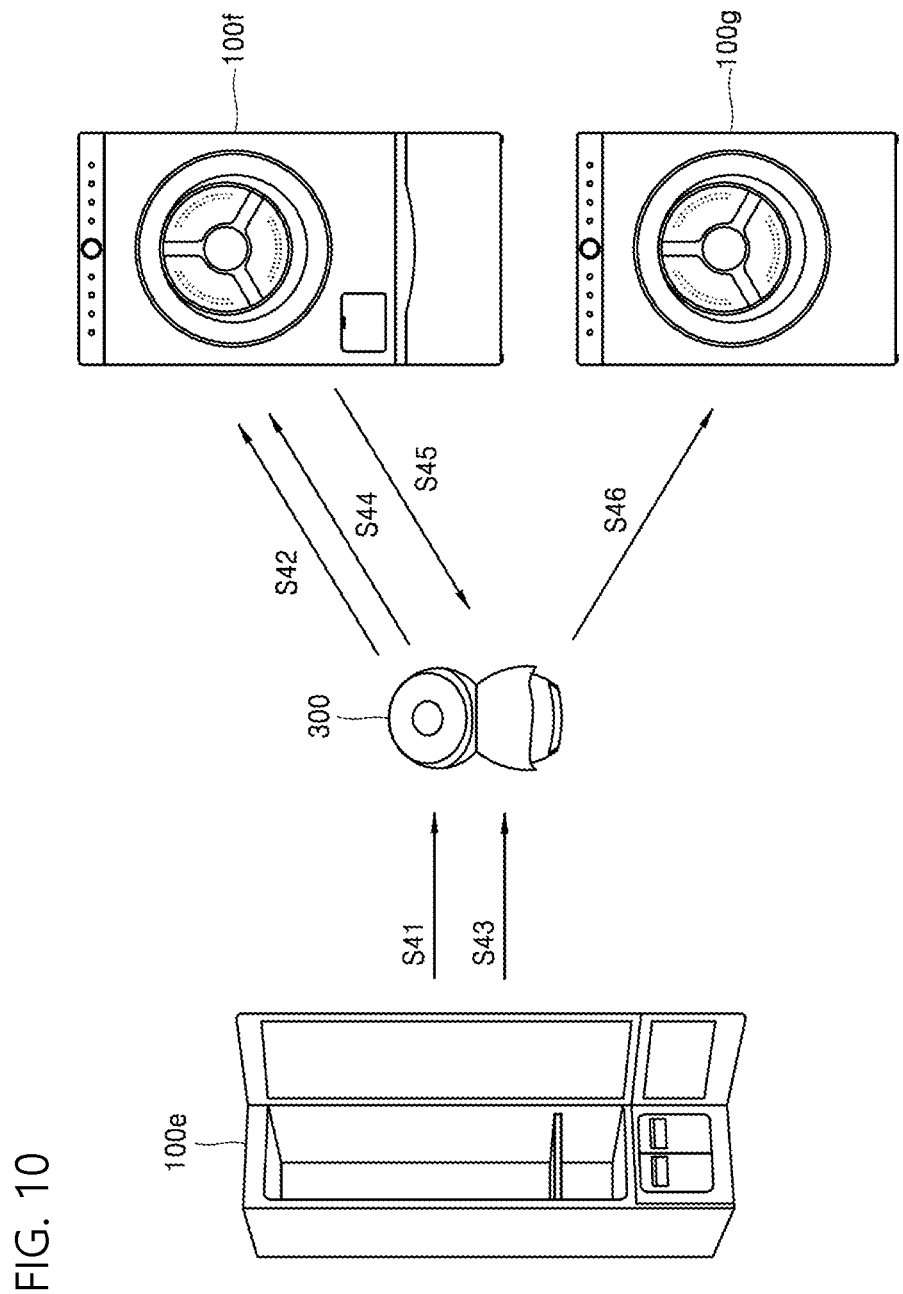
FIG. 10 shows a process in which a schedule bot 300 controls devices according to another embodiment of this application.

FIG. 10 shows another process in which a schedule bot 300 controls devices by another embodiment of this application. A electric wardrobe for clothes storage 100e, a washing machine 100f, and a dryer 100g will be described as the embodiment.

Clothes that a user wears may be arranged in the electric wardrobe for clothes storage 100e (hereinafter referred to as a wardrobe). The wardrobe 100e may perform functions such as dust removing, providing moisture for arranged clothes, and monitoring a state of clothes, etc. In a function performing process, the wardrobe 100e may determine that the clothes need to be washed. In this case, the wardrobe 100e may transmit a kind and a current state of the clothes to the schedule bot 300 (S41). A configuration of a transmitted message may be as follows.

MSG: {Cloth="Blouse", Stain="Ketchup", StainLevel="Heavy"}

When the above message is transmitted to the schedule bot 300, the schedule bot 300 may search the most suitable device to solves the above problem in a device information storage unit 310. The schedule bot 300 may search the washing machine 100f, and transmit information on a function or an option (Normal & Warm Water) required for the washing machine 100f to perform washing to the washing machine 100f (S42). It is possible to guide it to the user by speech as follows. S42 may be omitted. That is, the schedule bot 300 may firstly perform a speech guidance without informing it to the washing machine 100f in advance.

When the schedule bot 300 speaks "please put a blouse in a wardrobe into a washing machine", the user opens a door of the wardrobe 100e and takes out the blouse. The wardrobe 100e may also transmit this information to the schedule bot 300 (S43), and the schedule bot 300 may transmit a time schedule so that the washing machine 100f prepares a washing of the blouse (S44). Of course, function information can be transmitted together with the time schedule information. In particular, when S42 is omitted, the time schedule and the function information may be transmitted together.

When the user puts the blouse into the washing machine 100f, and the user can selects a prepared function without modification, or change an option of the prepared function, the washing machine 100f can transmit this status information to the schedule bot 300 as a message as in the below (S45).

MSG: {Course="Normal", StainLevel="Heavy", Water="WarmWater"}

The schedule bot 300 may search a device that performs the next function based on the received message in the device information storage unit 310. The schedule bot 300 may search out the dryer 100g and transmit function information, which includes a function or an option required for the dryer 100g to dry (Cool Dry), to the dryer 100g (S46). In this process, the information on a time point, at which the washing is finished, may also be transmitted to the dryer 100g in step S46 as the time schedule.

The dryer 100g can prepare a corresponding function based on received information. When the user actually puts the blouse into the dryer 100g, the dryer 100g may perform a previously configured function without modification thereof, or perform the previously configured function with partial modification thereof by the user.

In this process, as described in FIG. 9, the schedule bot 300 can transmit a message of notifying a drying completion to a communication device (cell phone) 100d of the user at a time point when the dryer 100g is to complete a drying function.

When there is no schedule bot 300, a server 500 may substitute such functions of the schedule bot 300. This will be described in more detail.

Figure 11:
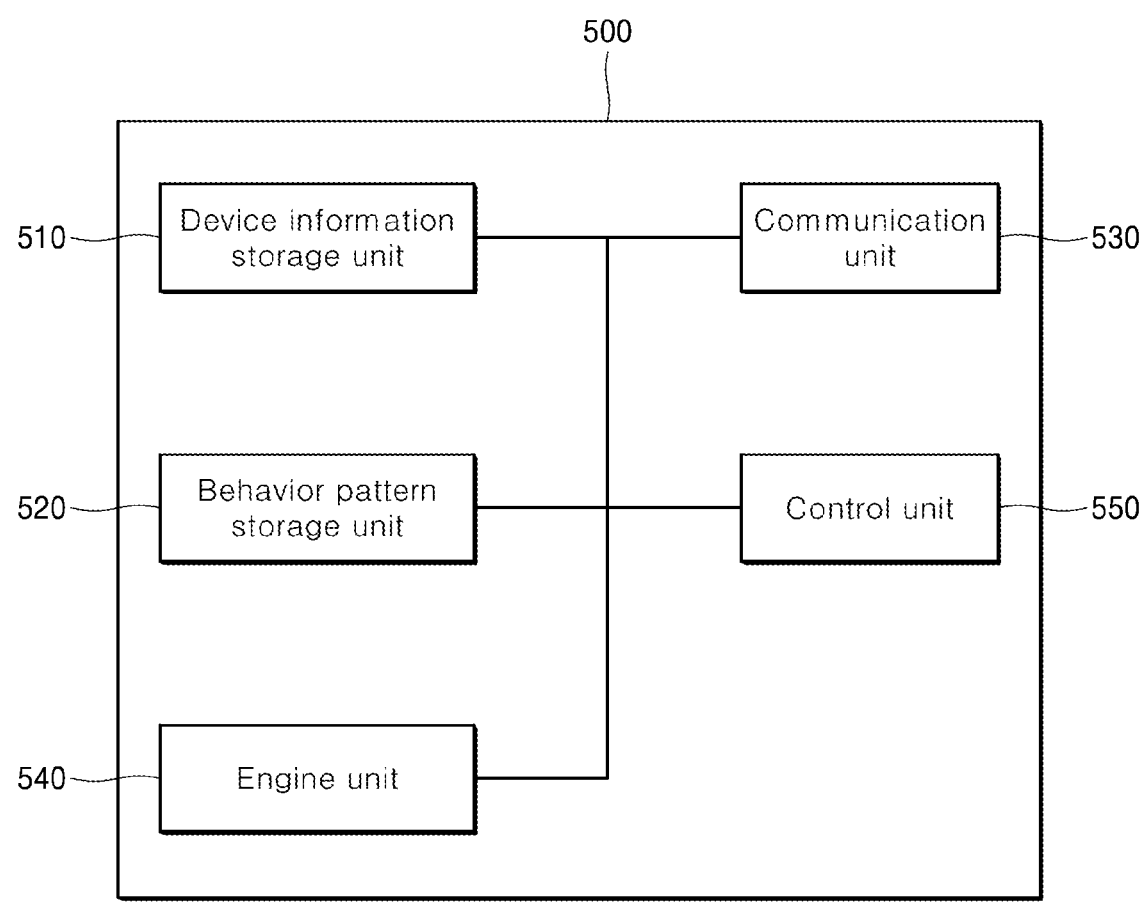
FIG. 11 is a view shows a configuration of a server according to an exemplary embodiment of this application.

FIG. 11 shows a configuration of a server by an exemplary embodiment of this application.

The server may have a similar configuration to a schedule bot 300 in the above. However, since the server 500 can communicate with the devices arranged in a plurality of homes, it is possible to control various home devices at the same time. Further, the server 500 may include an engine unit 540 separately.

Referring to components of the server 500, a device information storage unit 510 may store information of devices belonging to two or more related groups, and store information on related functions of the devices. A behavior pattern storage unit 520 may receive behavior pattern information of a user with respect to usage of the devices from the devices and store it. At this time, the behavior pattern storage unit 520 may store a behavior pattern of each of various users, and when a behavior pattern of a user in any one house is not stored, the engine unit 540 can deduce it by using similar behavior pattern information of another user.

When a control unit 550 receives information of a first function from a first device of these devices, the control unit 550 may identify a related device that performs a subsequent second function in response to the first function, and generate a time schedule and function information transmitted to the related device. A communication unit 530 may transmit and receive messages to and from the devices, and transmit the generated time schedule and function information to the related devices.

The engine unit 540 may store information having high relevance with each other among the information that the plurality of devices transmit. More specifically, the engine unit 540 may store information that has high relevance with each other among a use time of a device, a use time of a related device, and functions that a user uses in a device or a related device. It is also possible to calculate a function or an estimate time for a function based on a behavior pattern of a specific user in the past, or it is also possible to calculate them based on a behavior pattern of other users.

With regard to the user information, in a case in which individual users are identifiable in a same home, it is possible to determine a behavior pattern for each user separately. On the other hand, in a case where there is no identification of individual users, it is possible to determine one virtual behavior pattern representing each behavior pattern of the users in a space unit (home or an office, etc.).

Further, the control unit 550 may generate a time schedule and the function information on the first function that each device performs, based on the behavior pattern information of the user. In this process, the time schedule may be information on a time difference between the execution of the first function and the second function. It is described in the above that the related device is controlled so as to maintain a Ready state where the related device prepares itself for performing the second function after a time corresponding to the time difference passes.

As shown in FIG. 4 in the above, the server 500 may search for a related device to perform the next function based on the information that respective devices transmit, calculate a time schedule such as an estimated time, and transmit it to the related device. In each matter of FIGS. 9 and 10 in the above, the server 500 may provide the function of the schedule bot 300 instead of the schedule bot 300.

The schedule bot 300 manages the collected information in a specific space; however, the server 500 may manage the information that devices in a very large space transmit per a unit sub-space, and generate and transmit messages to the devices accordingly.

Conventional smart home appliances use a remote control/monitoring and a smart diagnosis, etc., for each product group, respectively. In case of a refrigerator/an oven, a limited interlocking function, such as recommending a recipe based on food materials stored in the refrigerator and transmitting cooking data to the oven, is provided. That is, such a limited function is interlocked only when the user actually selects and uses that particular function, so that this function cannot be actively utilized.

On the other hand, this invention can expand an inter-product interlocking service function by sharing a product use pattern and a product use history of the user and by combining them with an artificial intelligence. Thus, this invention enables executing a proper function at a certain time point automatically based on a use (behavior) pattern of user, and it is possible to increase a use efficiency of a device by suggesting a use function of a device to the user.

When the above-mentioned schedule bot 300 or server 500 is applied, the product use history with respect to the refrigerator, the dishwasher, and the oven, etc., is collected in the server 500 or the schedule bot 300. A use (behavior) pattern can be learned through the control unit 350 of the schedule bot 300 or the engine 550 of the server 500.

Based on learned data, it is possible to actively suggest new recipe recommendation based on a previously used recipe, food materials in the refrigerator, and then actively configure a cooking function of a oven with regard to a recipe based on the recommend recipe and previously learned configuring data (a Pre heat temperature and a maintenance time, etc.) without an intervention of a user.

Further, when the dishwasher is used, based on a recipe (oily food, etc.) applied to the oven, it is possible to suggest a detergent concentration and a washing time of the dishwasher and prepare the dishwasher to perform a function by considering a pattern of user in which a dishwasher is uses after an oven is used.

In particular, in case where the schedule bot 300 or the server 500 is used, the respective related devices may transmit information of a function that is currently performed or is scheduled to be performed to the schedule bot 300 or the server 500, receive the function information and the time schedule calculated in the schedule robot 300 or the sever 500, and operate accordingly. Thus, there is no need to install a separate application or an update of a device.

Further, since the respective related devices have a communication module such as Wi-Fi, it is possible to transmit the behavior pattern of the user with respect to the respective devices to the schedule bot 300 or the server 500, and can learn an accumulated behavior pattern. Since a learned behavior pattern of a user may be compared with a behavior pattern of another user in another space to extract a feature point, or the similar behavior patterns can be applied, it is possible for a user to receive a suggestion for a function of a device based on the behavior pattern of another user, even in the case the user uses the device for the first time.

When the embodiments of this invention are applied, the related devices, the schedule bot 300, or the server 500 may learn the use pattern of the user for each of the related devices to actively provide an interlocking service between the different related devices.

Although components included in the exemplary implementation of this invention are described as being combined to one, or as being coupled to operate, such exemplary implementation is not necessarily limited to this specific example, and these components can be selectively combined to one or more and coupled to operate within the purpose range of this invention. Further, although all of the components may be implemented as an independent hardware, a part or all of each of the components may be selectively combined and implemented as a computer program that has a program module to perform a part or all of the functions combined in one or a plurality of hardwares. Codes and code segments that are included in the computer program may be easily deduced by those skilled in the art of this invention. The computer program may be stored in computer readable media that a computer can read, and may be read and implemented by the computer, so as to implement the invention. The storage medium of the computer program may include a storage medium including a semiconductor recording element, an optical recording medium, a magnetic recording medium. Further, the computer program that implements the embodiment of this application may include a program module that is transmitted in real time through an external device.

While this invention has been mainly described referring to the exemplary implementation of the invention hereinabove, various modifications and changes can be made at the level of those skilled in the art. Therefore, unless such a modification and change do not deviate the range of this invention, it will understand that they are included in the scope of this invention.

What is claimed:

1. A device configured to control a related device based on an operation situation, comprising:

a controller configured to: (i) control the device to perform a physical function, (ii) identify the related device that performs a subsequent second function in response to a first function that is performed or is scheduled to be performed in the device, and (iii) generate a time schedule and function information to be transmitted to the related device, wherein the time schedule and function information are generated based on behavior pattern information of a user; and a transceiver configured to transmit the time schedule and the function information that the controller generates to the related device for performing the subsequent second function by the related device, wherein the device and the related device belong to a related group, wherein the related device performs functions associated with the device or any other device of the related group in a time series, wherein the related group includes two or more devices operating related functions, the functions including cooking or washing, wherein the related device is configured to perform the second function based on estimated ending time of the first function, wherein the function information includes an end time point of the first function that is estimated from the behavior pattern information of the user, wherein the behavior pattern is learned by use history with respect to the device or the related device, and wherein an operation order or relation of the first and second functions performed by the device and the related device is stored as a form of a database in each device, and the device is configured to transmit a message that instructs the related device to prepare for performing a subsequent specific function at a specific time point.

2. The device of claim 1, wherein the behavior pattern information of a user is with respect to the first function.

3. The device of claim 1, wherein the behavior pattern information of a user includes information which is collected from the device and the related device with respect to use of the device and the related device.

4. The device of claim 1, wherein the identifying of the related device is performed based on information which defines an operation order between the device and the related device, and is stored in the device.

5. The device of claim 1,
wherein the time schedule includes information on a time difference between the execution of the first function and the second function, and
wherein the related device maintains a Ready state in which the related device is prepared for performing the second function after a time corresponding to the time difference passed, based on the received time schedule and function information.

6. The device of claim 1,
wherein the controller is configured to generate information of the first function that is performed or is scheduled to be performed by the device, and
wherein the transceiver transmits the generated information on the first function to a schedule management device.

7. The device of claim 6,
wherein the controller is configured to generate behavior pattern information of a user with respect to the first function that the device performs, and wherein the transceiver transmits a time schedule based on the behavior pattern information to the schedule management device.

8. The device of claim 7, wherein the time schedule is information on the first function and an end point of the first function calculated from the behavior pattern information of the user.

9. The device of claim 6,
wherein the schedule management device is a schedule bot that communicates with devices of a related group including the device and is arranged in a same space with the device, or a server that communicates with the devices of the related group including the device and is arranged in a space different from another space where the device is located.

10. The device of claim 1,
wherein the device is controlled by the related device based on an operation situation, comprising:
wherein the transceiver receives time schedule and function information from the related device or a schedule management device; and
wherein the controller controls the device to maintain a Ready state in which the device is prepared for performing the first function at a time point indicated in the time schedule by using the time schedule and the function information that the transceiver receives.

11. The device of claim 10, wherein the time schedule includes information on a third function performed in the related device prior to the first function and on an end point of the third function calculated from behavior pattern information of the user.

12. The device of claim 10,
wherein the transceiver receives the time schedule and the function information from the related device, and
wherein the function information includes information on a third function performed in the related device prior to the first function.

13. The device of claim 10,
wherein the schedule management device is a schedule bot that communicates with the related device and the device, and is arranged in a same space with the device, or
wherein the schedule management device is a server that communicates with the related device and the device, and is arranged in a space different from another space where the device is located.

14. A schedule bot configured to control a related device based on an operation situation, comprising:
a device information storage configured to store (i) information on devices belonging to two or more related groups and (ii) information on related functions of the devices;
a behavior pattern storage configured to store behavior pattern information of a user with respect to use of the devices;
a controller configured to, based on information on a first function being received from a device among the devices, identify the related device that performs a subsequent second function in response to the first function, and generate a time schedule and function information to be transmitted to the related device for performing the subsequent second function, wherein the time schedule and the function information are generated based on the behavior pattern information; and a transceiver configured to transmit and receive messages to and from the devices, and transmit the time schedule and the function information that the controller generates to the related device, wherein related devices of the related group perform functions associated with each other in a time series, wherein the related group is related to cooking or washing and the two or more devices in the related group are related functionally, wherein the related device is configured to perform the second function based on estimated ending time of the first function, wherein the function information includes an end time point of the first function that is estimated from the behavior pattern information of the user, wherein the behavior pattern is learned by use history with respect to the device or the related device, and wherein an operation order or relation of the first and second functions performed by the device and the related device is stored as a form of a database in each device, and the device is configured to transmit a message that instructs the related device to prepare for performing a subsequent specific function at a specific time point.

15. The schedule bot of claim 14, wherein the controller generates the time schedule and the function information based on the behavior pattern information of the user with respect to the first function that the device performs.

16. The schedule bot of claim 14,
wherein the time schedule is information on a time difference between the execution of the first function and the second function, and
wherein the related device maintains a Ready state in which the related device is prepared for performing the subsequent second function after a time corresponding to the time difference passes.

17. A server configured to control a related device based on an operation situation, comprising:
a device information storage configured to store (i) information of devices belonging to two or more related groups and (ii) information on related functions of the devices;
a behavior pattern storage configured to receive behavior pattern information of a user with respect to use of the devices from the devices and store the information;
a controller configured to, based on information on a first function being received from a device among the devices, identify a related device that performs a subsequent second function in response to the first function, and generate a time schedule and function information to be transmitted to the related device for performing the subsequent second function, wherein the time schedule and the function information are generated based on the behavior pattern information; and
a transceiver configured to transmit and receive messages to and from the devices, and transmit the time schedule and the function information that the controller generates to the related device,
wherein related devices of the related group perform functions associated with each other in a time period,
wherein the related group is related to cooking or washing and the two or more devices in the related group are related functionally,
wherein the related device is configured to perform the second function based on estimated ending time of the first function,
wherein the function information includes an end time point of the first function that is estimated from the behavior pattern information of the user,
wherein the behavior pattern is learned by use history with respect to the device or the related device, and
wherein an operation order or relation of the first and second functions performed by the device and the related device is stored as a form of a database in each device, and the device is configured to transmit a message that instructs the related device to prepare for performing a subsequent specific function at a specific time point.

18. The server of claim 17,
wherein the server further comprises an engine that stores information having high relevance with each other among a use time of the device, a use time of the related device, and functions that the user uses in the device or the related device, and
wherein the controller stores the time schedule and the function information by using the information stored in the engine.

19. The server of claim 17, wherein the controller generates the time schedule and the function information based on the behavior pattern information of the user with respect to the first function that the device performs.

20. The server of claim 17,
wherein the time schedule includes information on a time difference between the execution of the first function and the second function, and
wherein the related device maintains a Ready state in which the related device is prepared for performing the second function after a time corresponding to the time difference passes.

* * * * *